United States Patent [19]
Honkasalo (nee Zhu) et al.

[11] Patent Number: 5,754,595
[45] Date of Patent: May 19, 1998

[54] DEMODULATED RADIO SIGNALS

[75] Inventors: Zhi-Chun Honkasalo (nee Zhu), Helsinki, Finland; Michael David Jager, Camberley, England; Harri Honkasalo, Helsinki, Finland

[73] Assignee: Nokia Mobile Phones Limited, Salo, Finland

[21] Appl. No.: 635,454

[22] Filed: Apr. 19, 1996

Related U.S. Application Data

[63] Continuation of Ser. No. 189,302, Jan. 28, 1994, abandoned.

[30] Foreign Application Priority Data

Feb. 2, 1993 [GB] United Kingdom ............ 9302039

[51] Int. Cl.⁶ .................... H04L 25/34; H04L 25/06
[52] U.S. Cl. .................. 375/286; 375/287; 375/317; 375/319
[58] Field of Search .................... 375/286, 287, 375/292, 317, 319, 320; 341/118, 143, 155; 330/259

[56] References Cited

U.S. PATENT DOCUMENTS

| | | | |
|---|---|---|---|
| 3,801,913 | 4/1974 | Daguet | 375/229 |
| 4,602,374 | 7/1986 | Nakamura | 375/287 |
| 4,771,267 | 9/1988 | Russell, Jr. | 341/118 |
| 4,852,126 | 7/1989 | Tanaka | 375/76 |
| 4,860,311 | 8/1989 | Storberg | 375/19 |
| 4,873,702 | 10/1989 | Chiu | 375/76 |
| 4,972,408 | 11/1990 | Herve | 375/17 |
| 4,989,219 | 1/1991 | Gerdes | 375/17 |
| 5,095,496 | 3/1992 | Jang | 375/76 |
| 5,142,554 | 8/1992 | Stribling | 375/20 |
| 5,175,749 | 12/1992 | Ficht | 330/259 |
| 5,222,028 | 6/1993 | Cason | 375/76 |

Primary Examiner—Steven Saras
Assistant Examiner—Vijay Shankar
Attorney, Agent, or Firm—Perman & Green, LLP

[57] ABSTRACT

A received and demodulated multi-level signal (32) is corrected for D.C. offset by a feedback loop (34) which applies a correction signal (38) to the multi-level signal (32). Initial coarse correction is provided by feeding the corrected signal (42) into the feedback loop where a low pass filter (36) averages the corrected signal over time and detects departure from zero of this time-averaged signal. After initial coarse correction, finer correction of D.C. offset is provided in a data-aided mode in which detected data values (46) are fed into the feedback loop (34). The method achieves D.C. offset correction without the need to know anything about the data pattern of the received signal (32).

14 Claims, 2 Drawing Sheets

1

DEMODULATED RADIO SIGNALS

This is a continuation of application Ser. No. 08/189,302 filed on Jan. 28, 1994, now abandoned.

FIELD OF THE INVENTION

This invention relates to a method of and apparatus for correcting D.C. offset in a multi-level digital signal which has been received and demodulated in a radio. The invention is particularly, but not exculsively, applicable to the correction of D.C. offset in the multi-level digital signal emanating from a frequency discriminator, prior to signal detection.

BACKGROUND TO THE INVENTION

For digital frequency modulated (or phase modulated) systems employing frequency discriminator receivers, the output circuit of the discriminator needs to be D.C. coupled since the demodulated baseband signal contains a D.C. component. Any frequency error in the frequency modulated carrier before a frequency discriminator receiver appears as an additional D.C. offset in the discriminator output signal, so that all the received data symbols are offset from their nominal voltage levels by a fixed amount that is directly proportional to the frequency error. This offset, if not compensated correctly before going through the threshold level detection, causes an increase in detection error and hence performance degradation. In the worst case, the D.C. offset is so large that the received data symbols fall into incorrect detection bands, leading to erroneous detection even in the absence of noise. Although the receiver normally employs automatic frequency control (AFC) to track the carrier frequency, it often adapts too slowly and even a residual frequency error of several hundred Hertz may be sufficient to cause noticeable increase in detection error. Furthermore, the practical analogue frequency discriminator circuit itself may often contain some imbalance, causing further D.C. offset in its output signal. This offset varies from component to component and drifts with temperature. To reduce or compensate it using conventional analogue methods increases circuit complexity and receiver costs.

PRIOR ART

U.S. Pat. No. 4,873,702 (Chiu) discloses a method of correcting D.C. offset in multilevel digitally modulated signals. The data transmission system of Chiu is arranged to send a particular preamble signal each time a different data source begins transmission of its data. The present invention aims to provide a method of and apparatus for correction of D.C. offset not requiring the transmission of any particular preamble signal.

SUMMARY OF THE INVENTION

According to one aspect the invention provides a method of correcting D.C. offset in a multi-level digital signal which has been received and demodulated, comprising employing a feedback loop to generate a correction signal which is fed back and applied to the uncorrected signal so as to correct the latter without the need for any knowledge about the data pattern of the received signal, wherein the method includes coarse correction, during which comparatively large D.C. offsets can be tolerated followed by fine correction, during which comparatively small D.C. offsets only can be tolerated.

The invention thus has the advantage that it is compatible with digital cellular radio communications systems currently being adopted by national and intra-national standards-setting authorities, in which the transmitted data does not incorporate a preamble, or other component, included specially for D.C. offset correction purposes.

Preferably, the corrected signal is averaged over time in the feedback loop and the correction signal is representative of the departure from zero of the time-averaged corrected signal. The feedback loop may include a low pass filter which averages the corrected signal over time and which produces the correction signal.

In the preferred embodiment the multi-level signal, after detection, is applied to the feedback loop, the correction signal being representative of the detected signal. The detected signal is conveniently subtracted from the corrected signal and the resultant difference signal is averaged over time in the low pass filter, the output of which provides the correction signal.

The multi-level signal may be derived from a digital frequency discriminator in system hardware, or in an alternative arrangement the multi-level signal can be derived from an analog frequency discriminator, the output of which is passed through an analog to digital convertor before application of the inventive correction method.

According to another aspect the invention provides apparatus for correcting D.C. offset in a multi-level digital signal which has been received and demodulated, the apparatus comprising a feedback loop operative to generate a correction signal which is fed back and applied to the uncorrected signal so as to correct the latter without the need for any knowledge about the data pattern of the received signal, means for injecting into the loop non data-aided correction values in order to implement coarse correction during which comparatively large D.C. offsets can be tolerated, and means for injecting into the loop data-aided correction values in order to implement fine correction during which comparatively small D.C. offsets only can be tolerated.

BRIEF DESCRIPTION OF THE DRAWINGS

The invention will now be further described, by way of example, with reference to the accompanying drawings, in which.

DESCRIPTION OF PREFERRED EMBODIMENTS

Figure 1:
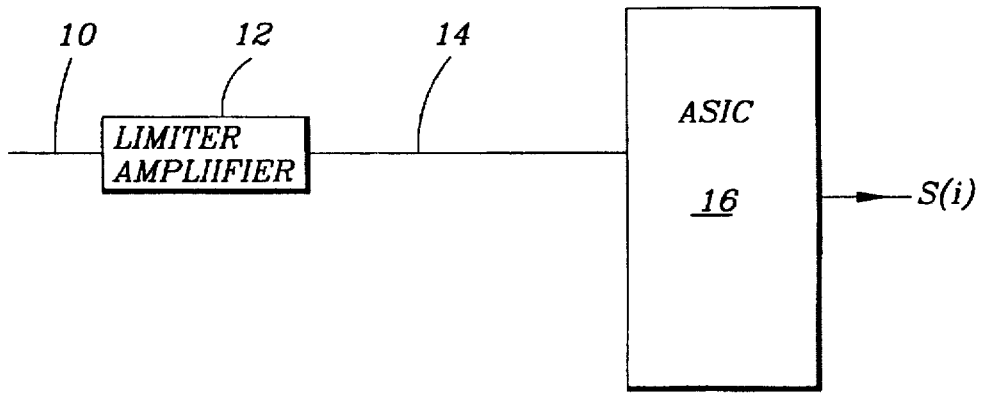
FIG. 1 shows in block diagrammatic form a demodulator which employs digital frequency discrimination and which produces a multi-level output signal suitable for correction by the invention.

The demodulator of FIG. 1 is intended to be included in the receiver section of a hand-held mobile radio. The transmitted signal consists of a sinusoidal carrier modulated by differential quaternary phase shift keying (DQPSK) to carry the transmitted information. The carrier is converted to a fixed intermediate frequency of 450 KHz, in accordance with conventional practice, to provide an intermediate frequency (IF) signal indicated at 10 in FIG. 1.

The signal 10 is fed to a limiter amplifier 12 which transforms the signal 10 to a rectangular output waveform 14 by taking a narrow slice of a signal about the value zero and amplifying the sliced signal to the required level. The variations in the phase of the signal 10 are thus preserved in the signal 14.

The signal 10 is generally sinusoidal but in each symbol period T the phase of the carrier is varied or modulated to code a transmitted symbol value. The modulation is to level four, meaning that in each symbol period, the phase is modulated to any one of four different levels. This four level modulation enables two bits of binary information to be coded by each phase shift, thus:

Phase shifted by $$+\frac{\pi}{4}$$

radians means 00 bit pair (or symbol value +1)
Phase shifted by $$+\frac{3\pi}{4}$$

radians means 01 bit pair (or symbol value +3)
Phase shifted by $$-\frac{\pi}{4}$$

radians means 10 bit pair (or symbol value −1)
Phase shifted by $$-\frac{3\pi}{4}$$

radians means 11 bit pair (or symbol value −3)

Hence, the phase shift of the signal 10 in each symbol period T is representative of the transmitted bit pair of that symbol. The phase of the carrier does not alter suddenly at a symbol period transition. There is a progressive alteration in phase throughout the symbol period, the fastest change in phase occurring in the central region of the symbol period T.

The system digital hardware (called ASIC) 16 receives the signal 14 and, by frequency discrimination, derives an output signal S(i) which, for each symbol period T, is at one of four levels depending on the phase of modulation. This derivation is explained in greater detail in the applicants' co-pending UK Patent Application No 9223931.8.

Figure 2:
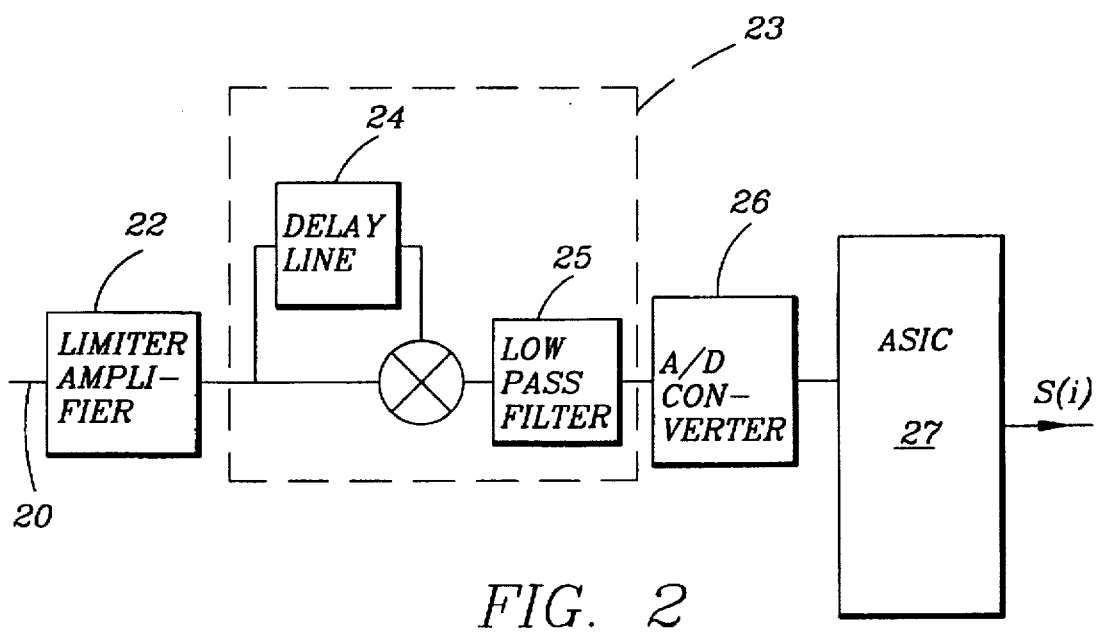
FIG. 2 shows in block diagrammatic form a demodulator similar to that of FIG. 1 but employing analog frequency discrimination, FIG. 3 explains the nature of the multi-level digital output signal produced by the demodulator of FIG. 1 or FIG. 2.

FIG. 2 shows an alternative demodulator using analog frequency descrimination. Referring to FIG. 2, an intermediate frequency signal 20 (which consists of a sinusoidal carrier modulated by DQPSK so as to carry transmitted symbol values) is fed to a limiter amplifier 22 and thence to an analog frequency discriminator 23 having a delay line 24 and a low pass filter 25. The discriminator 23 produces a frequency deviation signal which needs to be integrated over each symbol period to derive an output signal representative of the carrier phase change and, therefore, the transmitted signal. The output of the analog frequency discriminator 23 is converted to digital format in an analog to digital converter 26 and then fed to digital hardware 27, in which the signal is integrated and dumped into one of four decision bands depending on the modulation phase which is representative of the transmitted symbol value. The hardware 27 produces an output signal S(i).

Figure 3:
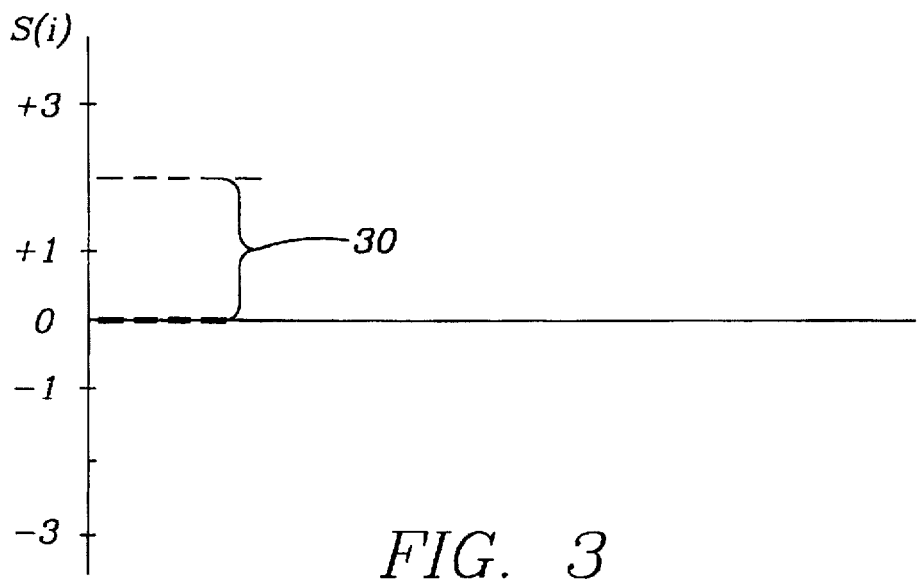

FIG. 3 explains the nature of the signal S(i) produced by the demodulator of FIG. 1 or FIG. 2.

Ideally, if the phase shift in any symbol period T is π/4, the output signal S(i) will be at a level representative of +1, indicating that the bit pair for that symbol is 00; similarly:

An S(i) level of +3 indicates a phase shift of $$\frac{3\pi}{4},$$

indicating the bit pair 01
An S(i) level of −1 indicates a phase shift of $$-\frac{\pi}{4},$$

indicating the bit pair 10
An S(i) level of −3 indicates a phase shift of $$-\frac{3\pi}{4},$$

indicating the bit pair 11.

In practice, the signal level S(i) will not be exactly 0, +1, +3, −1 or −3 and there will be a band of signal levels, centred on each ideal level. For example, if the signal level S(i) falls within the signal band 30 centred on +1, a subsequent decision will be made to ascribe level +1 to that signal. It will be appreciated that the other signal levels have corresponding decision bands, each centred on the corresponding level.

As previously mentioned, any D.C. error in the signal S(i) impairs performance and may cause the signal level to fall in an incorrect detection band, leading to erroneous detection. For example, if there is a D.C. offset which lifts all the signals by a value of plus 1 in FIG. 3, a signal which would be near the top of the decision band 30 in the absence of the offset would be taken into the decision band centered on plus 3, and incorrect detection would therefore ensue. The invention aims to correct such D.C. offset which in the digital case of FIG. 1 can arise from frequency error or from errors in the data itself, and in the analog case of FIG. 2 can arise from these two causes, plus the further possible cause of analogue circuit variations, eg drift with temperature.

Figure 4:
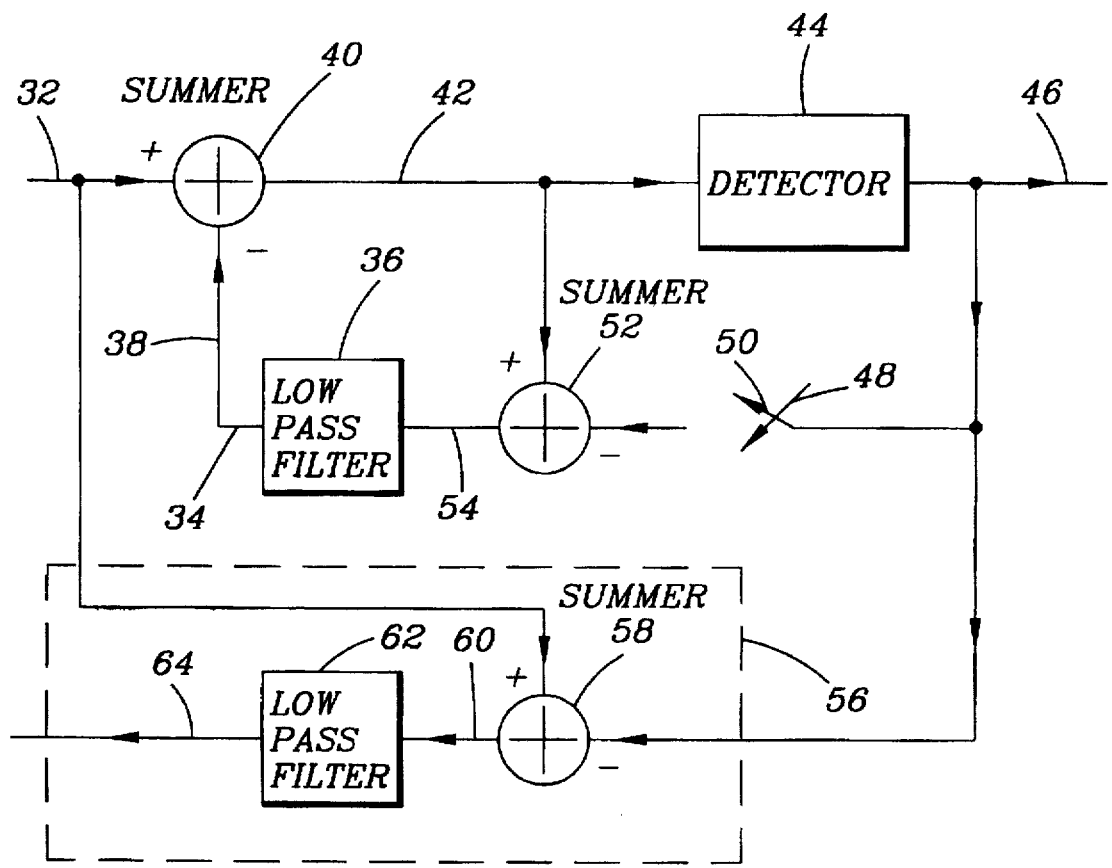
FIG. 4 shows in block diagrammatic form a circuit according to the invention and for correcting D.C. offset in the multi-level output signal of the demodulator of FIG. 1 or FIG. 2.

D.C. offset in the signal S(i) is corrected by the circuit shown diagrammatically in FIG. 4. The signal S(i) is applied at input 32. A recursive feedback loop 34, incorporating a low pass filter 36, produces a correction signal 38 which is subtracted from S(i) in algebraic summer 40 to produce a corrected signal 42.

The corrected signal 42 is fed to a detector 44 which places the corrected signal S(i) into one of the decision bands. For example, if the corrected S(i) for a particular symbol period falls within decision band 30 (FIG. 3) the detector 44 ascribes a phase value of π/4 to that particular symbol period. Hence, the output 46 of the detector 44 is a stream of phase values, corresponding to the sequence of phase modulation imparted to the signal received by the demodulator of FIG. 1 or FIG. 2.

During initial synchronisation, coarse correction is achieved by the feedback loop which takes the signal 42, averages it over time (eg half second) in the filter 36 and produces a correction signal 38 which is representative of the departure from zero of the time-averaged signal 42. This non data-aided correction relies on the fact that over time the average of the multi-level signal 32 will be zero. No knowledge about the data pattern of the received signal is necessary, in contrast to the prior art which relies on a known preamble signal. Hence, correct detection of data symbols takes place in the presence of large D.C. offset errors, resulting from large frequency errors. This is the non data-aided option indicated at 48 in FIG. 4.

After initial synchronisation, the data-aided option, indicated at 50, is implemented, providing finer correction. In this mode, the detected value signal 46 is applied as an input to the feedback loop 34. The signal 46 is subtracted from signal 42 in an algebraic summer 52, the resultant error signal 54 being averaged over time in the low pass filter 36 which produces the correction signal 38. The data-aided feedback loop can only tolerate moderate amounts of D.C. offset and acts to correct any biasing in the data pattern itself, for example if on average there are more positive data symbols than negative ones, this would cause a small D.C. offset in S(i). The data-aided recursive loop will also provide a continuous tracking of any variation of D.C. offset in the analog circuit of FIG. 2. Here again, D.C. offset correction is achieved without the need for a preamble signal.

In the case of a modulator using digital frequency discrimination (eg FIG. 1) the correction circuit of FIG. 4 preferably has a second recursive feedback loop 56 for providing automatic frequency tuning. This second feedback loop has an algebraic summer 58 which derives a correction signal 60 from the difference between signals 32 and 46. The correction signal 60 is fed to a low pass filter 62 which averages the signal 60 over time and produces a digital correction signal 64. This is fed through a digital to analog convertor (not shown) which then drives the frequency controller of the voltage controlled crystal oscillator which in turn controls the frequency of the input signal.

We claim:

1. A method of correcting D.C. offset in a multi-level digital frequency modulated signal which has been received and demodulated to constitute an input signal, said method comprising the steps of:

providing a feedback loop that is coupled to said input signal;

generating a correction signal in said feedback loop, that is derived from said input signal and combined with said input signal to produce a corrected input signal, said correction signal being produced by averaging said corrected input signal over time in said feedback loop, and wherein said combining of said correction signal with said input signal corrects offsets in the amplitude of said input signal thereby to produce said corrected input signal without the need for any knowledge about the data pattern of the received multi-level digital frequency modulated signal, and without the need for a reference signal, and wherein the method includes:

non data-aided, coarse correction, during which comparatively large D.C. offsets of a first signal, derived from said input signal, are detected and correction therefor incorporated into said correction signal to produce a coarse corrected input signal, followed thereafter by a data-aided, fine correction, during which comparatively small D.C. offsets of a second signal, derived from the coarse corrected input signal, are detected and correction therefor incorporated into said correction signal.

2. A method according to claim 1, wherein during said coarse correction, the correction signal is representative of the departure from zero of the time-averaged corrected input signal.

3. A method according to claim 2, wherein the feedback loop includes a low pass filter which averages the corrected input signal over time and which produces the correction signal.

4. A method according to claim 1, wherein, during said fine correction, the mutli-level corrected input signal is detected by being placed in decision bands to provide said second signal, which is applied to the feedback loop.

5. A method according to claim 4, wherein the second signal is subtracted from the corrected input signal and the resultant difference signal is averaged over time in a low pass filter, the output of which provides the correction signal.

6. A method according to claim 1, wherein the multi-level corrected input signal is detected by being placed in decision bands to provide said second signal, which is applied to an automatic frequency control circuit that compares the input signal with the second signal and produces a digital correction signal for controlling the frequency of the received multi-level digital frequency modulated signal prior to demodulation.

7. A method according to claim 1, wherein the multi-level digital frequency modulated signal is derived from a digital frequency discriminator in system hardware.

8. A method according to claim 1, wherein the multi-level digital frequency modulated signal is derived from an analogue frequency discriminator, the output of which is passed through an analogue to digital convertor before D.C. correction.

9. Apparatus for correcting D.C. offset in a multi-level digital modulated signal which has been received from a source and demodulated to form an input signal, the apparatus comprising:

a feedback loop coupled to said input signal and operative to generate a correction signal which is fed back and combined with the uncorrected input signal so as to correct the amplitude of the received uncorrected input signal without the need for any knowledge about the data pattern of the received multi-level digital modulated signal, and without the need for a reference signal, first means for injecting into the feedback loop non data-aided correction values in order to implement coarse correction derived from a first signal that is derived from said uncorrected input signal, during which comparatively large D.C. offsets can be tolerated, and second means for injecting into the feedback loop data-aided correction values in order to implement fine correction derived from a second signal that is derived from the coarse corrected input signal, during which comparatively small D.C. offsets can be tolerated.

10. A method according to claim 1, in which the corrected input signal is fed to a detector that produces a detection signal placing the corrected input signal into decision bands, so as to determine the values of the data carried by the input signal, and wherein said first signal comprises the time averaged corrected input signal before being fed to the detector, and which, during the coarse correction, is fed directly to a low pass filter that averages the first signal over time.

11. A method according to claim 10 wherein, during said fine correction, said time averaged corrected input signal is fed to said detector and the detection signal output by said detector comprises the second signal.

12. A method according to claim 11 wherein, during said fine correction, said second signal is applied to said feedback loop, in which it is subtracted from the time averaged corrected input signal and the resultant difference signal is averaged over time in a low pass filter thereby to be incorporated into the correction signal.

13. Apparatus according to claim 9, further comprising detector means for receiving and placing the corrected input signal into decision bands and generating an output signal representative of values of data carried by the input signal, and wherein:

said feedback loop comprises a low pass filter for time averaging the input signal fed thereto to provide said correction signal, and said first means for injecting non data-aided correction values is connected to said low pass filter and to the source of the input signal at a position upstream of the detector means so that said first signal comprises the time averaged corrected input signal prior to being fed to the detector, and is fed directly to said low pass filter.

14. Apparatus according to claim 13, wherein said second means for injecting the data-aided values derived from the second signal is connected to said low pass filter and to the output of the detector, such that the second signal is representative of the detected signal.

* * * * *